United States Patent [19]

Case et al.

[11] 4,412,165
[45] Oct. 25, 1983

[54] SAMPLED SERVO POSITION CONTROL SYSTEM

[75] Inventors: William J. Case, Winchester; Christopher N. Wallis, Eastleigh, both of England

[73] Assignee: International Business Machines Corporation, Armonk, N.Y.

[21] Appl. No.: 304,433

[22] Filed: Sep. 21, 1981

[30] Foreign Application Priority Data

Oct. 29, 1980 [EP] European Pat. Off. ............ 80303849

[51] Int. Cl.$^3$ .............................................. G05B 21/02
[52] U.S. Cl. ...................................... 318/636; 360/77
[58] Field of Search ................ 318/636, 632; 360/77, 360/78, 71

[56] References Cited

U.S. PATENT DOCUMENTS

| | | | |
|---|---|---|---|
| 3,555,524 | 1/1971 | Gerber | 318/632 |
| 3,771,136 | 11/1973 | Heneghan | 340/172.5 |
| 4,103,314 | 7/1978 | Case | 360/78 |
| 4,168,457 | 9/1979 | Rose | 318/632 X |
| 4,208,679 | 6/1980 | Hertrich | 360/77 |

OTHER PUBLICATIONS

IBM TDB vol. 18, No. 8, 1–76, A. J. Belts "Null Servo Pattern", p. 2656.
Neues aus der Technik, No. 3, 6-16-80, D. E. Würzburg "Ausrichten der Köpfe in einen Scheibenspeicher", p. 2.
IBM TDB vol. 19, No. 4, 9-76, pp. 1424–1426 J. E. Dohermann "Defect Skipping Among Fixed Length Records in Direct Access Storage Devices".
IBM TDB vol. 13, No. 11, 4–71, p. 3505 "Packwriter Write Correction System" R. S. Palmer & C. A. Walton.
IBM TDB vol. 22, No. 8A, p. 3269 "Track Servo System Compensating Pattern Defects" A. Marla & V. Zimmerman.
IBM TDB vol. 12, No. 11, 4-70, G. R. Santana "Generation of Position Correction Signal for All Disk Pack Surfaces" p. 1891.
IBM TDB vol. 22, No. 8A, 1-80, G. W. Brock et al. "Recording Position Signals on Record Disks", pp. 3127-3130.
"Sampled-Data Control Systems" McGraw Hill 1958,
J. R. Ragazzini & G. F. Franklin–Chapter 7, p. 145.
Patents Abstracts of Japan, vol. 1, No. 49, May 13, 1977, p. 3041e 76, "Head Access System of Magnetic Disc Device".
IBM TDB vol. 21, No. 3, 8–78, G. W. Brock & C. H. Kalthoff "Detecting Erroneous Servo in Record Storage Apparatus" pp. 932—933.
IBM TDB vol. 19, No. 6, 11–76, D. E. Griffiths & H. E. Van Winkle "Self-Calibrating Disk Storage Apparatus" pp. 1991-1992.
IBM–TDB vol. 13, No. 11, 4–71 p. 3505 "Packwrite Correction System" R. S. Palmer & C. A. Walton.
IBM–TDB vol. 22, No. 8A p. 3269 "Track Servo System Compensating Pattern Defects" A. Matla & V. Zimmerman.

Primary Examiner—B. Dobeck
Attorney, Agent, or Firm—Walter J. Madden, Jr.

[57] ABSTRACT

Servo records provided at intervals on a record medium are used in a sampled servo system to define data tracks on the medium. Asperities in the medium, or problems arising from the servo writing process can in some instances lead to mis-alignment of a servo path 33 defined by a servo sample with the corresponding desired data track. This causes non-zero position error signals to be produced even when the track following head is accurately positioned over the data track. The problem is solved by measuring the position error signals derived from each servo sample with the head constrained in the correct on-track position. The value of each of these position error signals is then stored as a digital number forming part of a correcting byte in the data section immediately preceding the associated faulty sample. The correction byte also includes a flag bit which is set to demark the next servo sample if the error is so large as to be deemed uncorrectable. Thereafter, in use if the flag bit is unset, the servo system reads the digital number from the correction byte, and uses it to dynamically correct the position error signal from the associated faulty servo sample. If the flag bit is set, the position error signal from the previous sample is carried forward and used instead of the position error signal from the current sample.

3 Claims, 5 Drawing Figures

PRIOR ART—ANALOGUE

PRIOR ART – DIGITAL

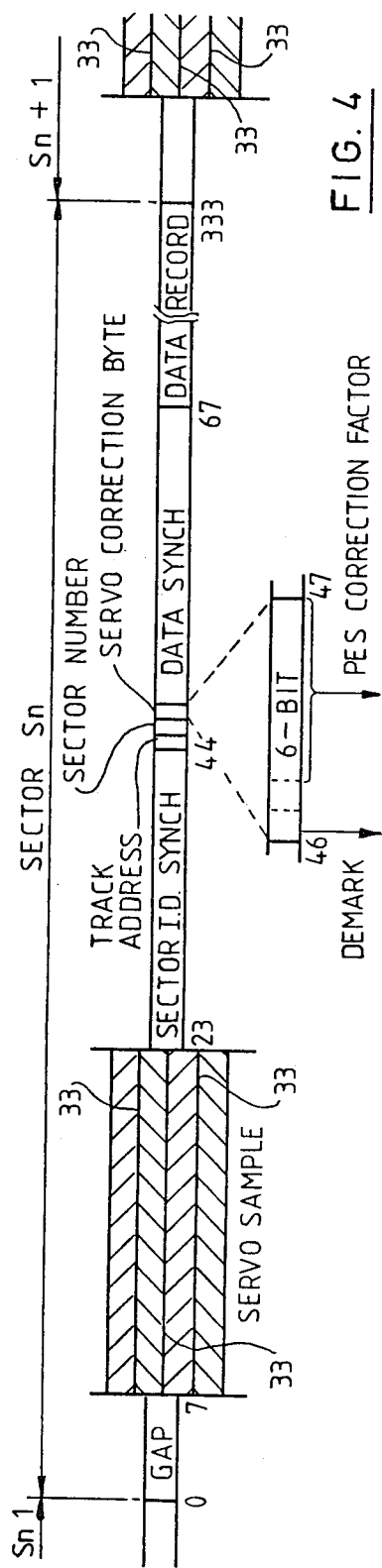
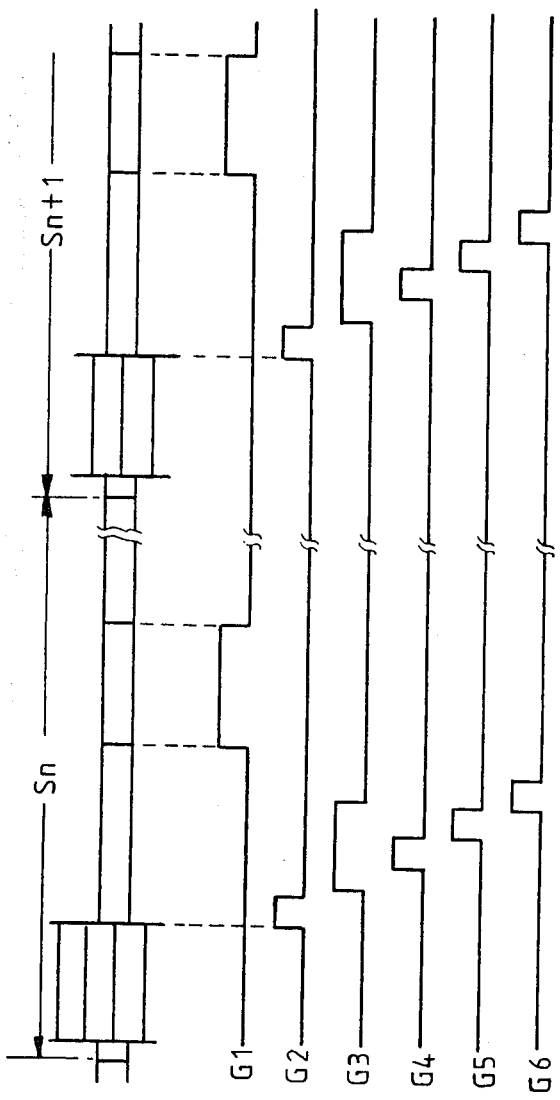

SAMPLED SERVO POSITION CONTROL SYSTEM

FIELD OF THE INVENTION

The invention relates to servo positioning systems in which only sampled position data is available for feedback control.

BACKGROUND OF THE INVENTION

High capacity magnetic recording devices using rigid or flexible disks as the recording medium require servo information for the accessing and following of data tracks. This servo information may be recorded on a separate disk surface dedicated to servo information; or interleaved with data records on the same disk surface; or even as a combination of both systems. The present invention is particularly concerned with recording devices in which the servo information is interleaved with data on the same record medium. One such arrangement is described in our published UK patent specification No. 1499268. In this publication, a record device is described in which servo position reference information is pre-recorded in a plurality of spaced servo records interleaved between larger regions reserved for data. The nominal data track center-line of each data region in a sector is defined by the servo information held in the immediately preceding servo record in that sector. Since, in this system, the servo information is contiguous with the subsequently recorded data, the data tracks of interest can be followed with greater accuracy and thus packed closer together. During use, servo records are sampled at times defined by clock signals, and servo position error signals produced by demodulating the servo signals derived by a recording head (transducer) reading the pre-recorded servo information are employed in a closed servo loop to drive the transducer positioning mechanism to reduce any positional off-set and thus to maintain the transducer in the desired on-track position.

The pre-recorded servo information on the record medium is often in the form of recorded signal blocks provided on each side of a pre-defined boundary line. This line is by definition co-linear with the center-line of the succeeding data track in the same sector, and a pre-ceding data track in the preceding sector. It will be appreciated that the precise nature of the pre-recorded servo information has little bearing on the present invention and many alternative encoding schemes are available. One suitable method of encoding servo information for example is described in an IBM Technical Disclosure Bulletin article entitle "Null servo pattern" by A. J. Betts, Vol. 18, No. 8, January 1976, pages 2656/7. Generally speaking, the sampled servo position error signal produced by demodulating the transducer signal derived from a servo record in a sector is in the form of an electrical signal, the magnitude and polarity of which indicates the amount and direction of off-set of the transducer reading the sample from the defined servo boundary, and thus defines the nominal data track position for that sector. The error signal derived from the servo sample may be maintained in analogue form for continuous network compensation in an analogue closed servo loop or converted into digital form and supplied to a digital controller for signal manipulation before being reconverted to analogue form to close the servo loop.

The mathematics, design and analysis of the operation of sample servo systems using either analogue or digital techniques is well known. Further information on such systems may be obtained by reference for example to the text book "Sampled-data control systems" by J. R. Ragazzini and G. F. Franklin, published by McGraw-Hill Book Company Inc. 1958. Chapter 7 of this book is of particular interest in that it is concerned with digital compensation of sampled data systems.

The recent reduction in cost of digital processing occasioned by the advent of large-scale integration of digital circuits together with the development of the microprocessor as a standard article has made digital processing more cost effective and the use of digital circuits in servo control loops is now becoming more wide-spread. As will become apparent, the present invention is applicable to servo positioning systems which are fully analogue in nature, as well as to systems in which conversion of the position error signal to digital form takes place as required by so-called digital servo control systems. In view of the reduction of cost of digital processing together with the advantage of avoiding the need for the precision components of analogue systems, a digital servo control system has been adopted to implement the invention and will be described hereinafter as the preferred embodiment of the invention.

Problem

The importance of accurate servo information is crucial for closely spaced tracks required for high data capacity devices. One of the limiting factors of performance of a sampled servo system is the inherent difficulties in maintaining an accurate and uniform signal energy content in the servo information blocks or records. The result of such non-uniformity is to produce error signals which do not reflect the true position of the transducer with respect to the nominal on-track position. The distortion of the error signals by whatever cause may be regarded as error signal noise. In a disk file with which this invention is particularly but not exclusively concerned, some components of this noise are repeatable from revolution to revolution and some are non-repeatable. It has been found that the incidence of repeatable errors far exceeds the incidence of non-repeatable errors especially where the record member is a flexible disk. It is therefore extremely advantageous to remove the repeatable error component from the error signal noise.

Sources of repeatable error include defects in the recording medium caused for example by the surface finishing process or, in the case of a magnetic disk, due perhaps to granularity of recording layer. Thickness variation of the recording layer can also change the energy content of the servo records and give rise to error signal noise. A further source of repeatable error is the servo writer used at the outset to pre-record the servo records in the servo sectors on the disk. Errors can arise as a result of servo writer position inaccuracy during writing, or due to timing errors caused for example by variations in servo writer spindle speed, or variations in head-to-record medium spacing during the writing of the servo records.

The magnitude of servo error signal noise can vary considerably and consequently its effect also varies. Thus, some defects produce noise which may only effect the accuracy of the sampled position error signal and which can be corrected, whereas others may produce noise which is so serious as to make the sampled signal unusable.

The problem of servo error noise is more acute with sampled servo systems than with continuous non-sampled systems. The error signal noise for a continuous non-sampled servo, repeatable and non-repeatable, is spread over the whole bandwidth (typically >5 kHz) of the position error signal. With the bandwidth of a typical continuous track following servo, less than 10% of the noise will be subject to amplification. However, in a sampled system, all the noise must be contained within a bandwidth of half the sampling frequency. Half sampling frequency may be of the order of 1 kHz. This means that much more of the noise will be amplified. It is therefore of considerable advantage to remove the repeatable component from the error signal in a sampled servo system.

Description of the Prior Art

IBM Technical Disclosure Bulletin Vol. 13, No. 11, April 1971 includes an article at page 3505 entitled "Packwriter write correction system" by R. S. Palmer and C. A. Walton. In this article, correction of faulty error signals detected at servo write time is performed by re-writing the servo records while modifying the amplitude of the write current in such a way as is calculated to correct the previously observed error. This is a somewhat inaccurate process and cannot compensate for errors caused by gross defects in the medium or variations in the write performance of the servo writer.

IBM Technical Disclosure Bulletin Vol. 22, No. 8A, January 1980 includes an article at page 3127 entitled "Recording position signals on record disks" by G. W. Brock et al which is of interest with respect to the present invention. The problem of inaccurate position error signals caused by defects in the record medium and head-to media interface problems is recognized in this article. The solution in this case is to avoid the problem by accurately writing the servo information blocks; carefully checking the energy content of each block; and re-writing faulty blocks in the hope that the fault will not re-occur. Where a servo error still persists the solution is to demark the succeeding data region or even the entire track to prevent future use as a data storage location. The system does not contemplate correction of faulty servo samples or in the case of excessive error of demarking the servo sample still permitting the use of the associated data region as disclosed in the present invention.

A further article is to be found in the same volume of the Bulletin at p. 3269 entitled "Track servo system compensating pattern defects" by A. Matla and V. Zimmerman which is also of interest with respect to the present invention. In this article, a track following servo system detects erroneous servo position error signals caused by pattern defects; ascertains which servo block or burst of information in the current sector appears to be defective; and provides an alternative substitute signal for the defective servo component. This compromise solution does not operate to correct a defective position error signal as described in the present invention.

The solution according to the present invention is to write the servo track, measure and store the magnitude of error in each servo sample and then to write into a portion of the data storage area of the foregoing sector a field expressing the appropriate correction. This correction may be a constant amount to be added to the observed position error signal when it is read in use in track following, or it may be an indication that because of a gross defect in the medium, that particular position sample is unusable.

A further feature of the invention is the arrangement of means by which a previous correct sample is carried forward and used instead of a grossly defective sample which cannot itself be corrected.

In order that the invention may be fully understood, a preferred embodiment thereof will now be described with reference to the accompanying drawings. In the drawings:

BRIEF DESCRIPTION OF THE DRAWINGS

FIG. 4 shows the format of one sector of a track used in the apparatus shown in FIG. 3; and FIG. 5 shows the waveforms of the various logical signals used to control the operation of the apparatus shown in FIG. 3.

DESCRIPTION OF THE BEST EMBODIMENT

The present invention is concerned with the problem of positional control of a transducer to follow a predefined path or track. The following description of prior art apparatus and such apparatus modified to incorporate the present invention is therefore limited to this aspect of control. The invention is applicable to servo position control apparatus utilizing either entirely analogue, or a mixture of analogue and digital control techniques. The invention as described hereinafter is embodied in track following servo control circuits for a disk file recording apparatus. The track access control circuits for controlling gross movement of the transducer from one track to another are not required for the understanding of the present invention and are not described.

Figure 1:
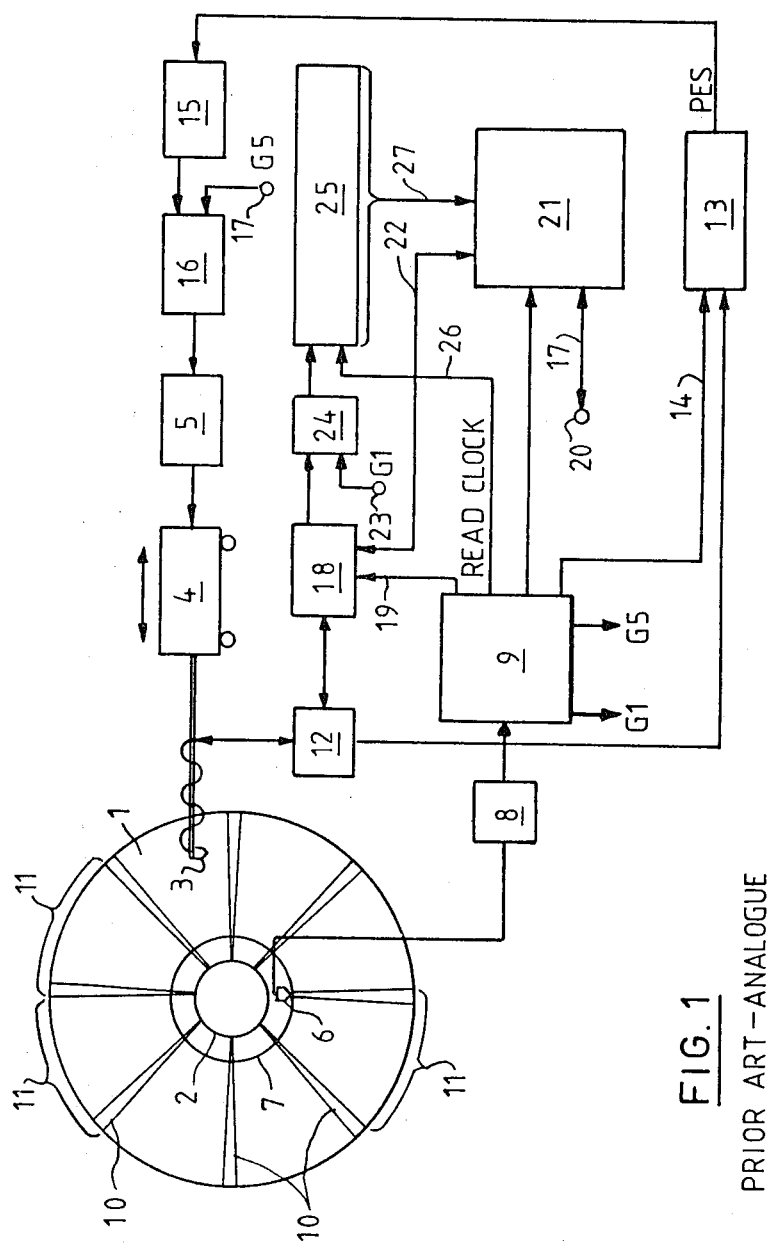
FIG. 1 shows a block diagram of a typical analogue track following servo in a conventional disk file recording apparatus.

FIG. 1 shows typical prior art disk recording apparatus employing a fully analogue position control loop. In the figure, a magnetic recording disk 1 is mounted for rotation on a drive hub 2. A magnetic record and playback head (transducer) 3 is movable across the disk by means of an actuator mechanism 4 supplied with current of appropriate magnitude and polarity from power amplifier 5. The transducer movement involved in the present invention is in the nature of fine positional adjustment required to accurately locate the transducer over the track being followed.

A fixed head 6 is provided to read timing information from a timing track 7 pre-recorded on the disk 1 in the vicinity of the drive hub 2. The signals generated by the head 6 are amplified by pre-amplifier 8 and supplied to timing control logic 9 which decodes the signals to provide various gating signals and control clocks to appropriate parts of the circuit as required.

Servo Control Loop

Transducer position information relative to the disk is derived from servo records pre-recorded on the disk defining a plurality of concentric data tracks available for the recording and subsequent playback of data by transducer 3. The servo information is not continuous on the disk surface but provided as a plurality of short pre-recorded servo records 10 each located at the start of an associated sector 11 of the disk and defining the nominal on track positions of data tracks in that sector. The particular manner in which the servo records are encoded to define tracks has little bearing on the present invention and any servo pattern from which position error signals may be derived, the magnitude and polarity of which indicate the magnitude and direction of displacement of the transducer from the nominal on-track position, is suitable. Although there are many alternative methods of encoding the pre-recorded servo information, for the purpose of understanding the present invention it may be assumed that the servo encoded pattern is as described in the aforementioned IBM Technical Disclosure Bulletin "Null Servo Pattern" by A. J. Betts.

When in track following mode, the transducer 3 is held accurately positioned over a selected data track so that data may be written on or read from the data regions in the sectors around the track. The servo and data information read from the track by transducer 3 is processed by read/write circuits 12 and applied to the inputs of demodulator 13. Timing logic 9 supplies demodulator gating signals over line 14 to gate the servo samples into demodulator 13 which generates position error signals, one for each servo sample, at its output in known manner.

Each position error signal is processed by a conventional lead/lag compensator 15. The output of compensator 15 is sampled by sample-and-hold circuit 16 under control of gating signal G5 generated by timing logic 9 and supplied to terminal 17 of circuit 16. The waveform of signal G5 is shown in FIG. 5 and will be referred to hereinafter. The sampled compensated analogue position error signal from circuit 17 is supplied to power amplifier 5 for the duration of the sector until the next servo sample has been processed.

The servo loop is closed by the amplified position error signal being used to drive the actuator 4 in a direction tending to eliminate any transducer track off-set.

Data Recording and Playback

The servo and data information processed by read/write circuits 12 and supplied to demodulator 13 is supplied simultaneously to the input of data channel 18 and the data content, that is the data identification (ID) field, sector address, and data record, gated through by means of a data timing signal generated by timing logic 9 and supplied to the data channel over line 19. Commands concerning the storage or retrieval of data are supplied to the file from an external control unit (not shown) via input/output terminal 20. The commands are interpreted in known manner by channel control logic 21 which controls the transfer of data records to be recorded on the disk or played back from the disk over data bus 22.

Prior to the initiation of each record/playback operation the sector ID field must be checked against the desired sector address. The sector ID field holds the address of the actual disk sector in the form of track number address and sector number address. This checking process is quite conventional, very often being conducted remote from the file in, for example, the file controller. In this embodiment it is conducted by the file channel control logic as a matter of convenience. Since the apparatus involved is used in the implementation of the present invention to be described hereinafter, it is briefly described.

Each sector ID field for the sector read from the track being followed is gated under control of gating signal G1, generated by timing logic 9, and supplied to terminal 23 through AND-gate 24 into shift register 25. The waveform of signal G1 is shown in FIG. 5 and will be referred to hereinafter. The shift register contains sufficient stages to hold the entire sector ID field which is clocked in at read time by a predetermined number of read clock pulses supplied from timing logic 9 over line 26. When shift register 25 is full, its contents are sampled over parallel bus 27 and compared with the sector ID of the data record required held in channel control logic 21. In the event of a match, the subsequent data supplied over data bus 22 is accepted by the logic 21 and transferred to a user unit via output terminal 20.

Figure 2:
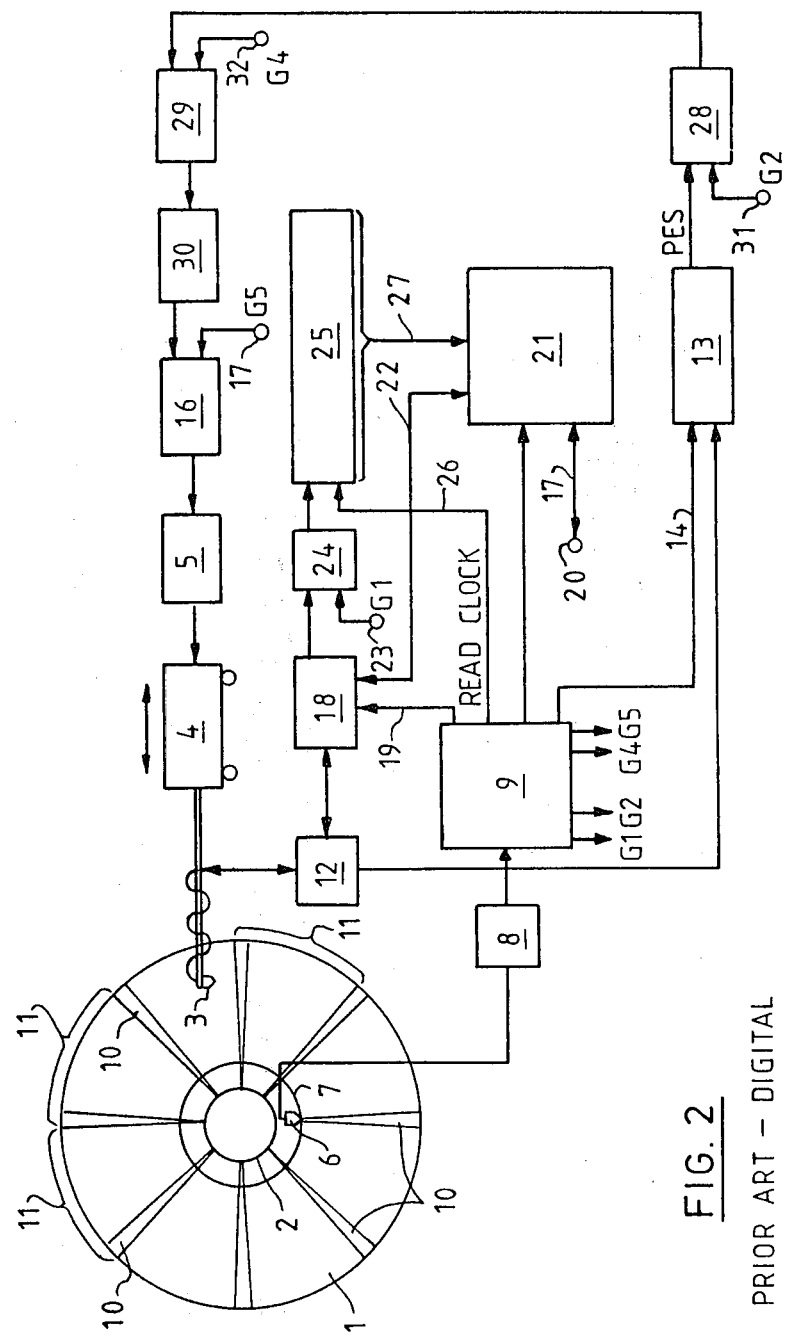
FIG. 2 shows the block diagram of FIG. 1 modified so as to perform servo signal compensation using digital techniques.

FIG. 2 shows the track following servo control circuits shown in FIG. 1 modified in order to compensate the position error signal using well known digital techniques. The majority of the component parts constituting the apparatus shown in FIG. 2 are identical to those shown in FIG. 1 and accordingly are identified by the same reference numerals. The modifications to the analogue arrangement consists merely of the addition of an analogue-to-digital converter 28, substitution of the analogue lead/lag compensator 15 by a digital controller 29, and the addition of a digital-to-analogue converter 30.

In operation, the analogue position error signals from demodulator 13 are gated through analogue-to-digital converter 28 under control of gating signal G2 generated by the timing logic 9 and applied to terminal 31. The waveform of signal G2 is shown in FIG. 5 and will be referred to hereinafter. The digitized position error signals from converter 28 are applied to one input of digital controller 29. The digital controller 29 samples the digitized position error signal gated at its input by gating signal G4 generated by timing logic 9, and applied to terminal 32, to perform the appropriate number sequence reconstruction required by the compensation process. The waveform of signal G4 is shown in FIG. 5 and will be referred to hereinafter. The compensated position error signal is converted to analogue form by converter 30 and sampled by sample and hold circuit 16 at the time defined by signal G5 referred to above. The sampled and held compensated analogue signal is used to close the servo loop in the usual manner.

Figure 3:
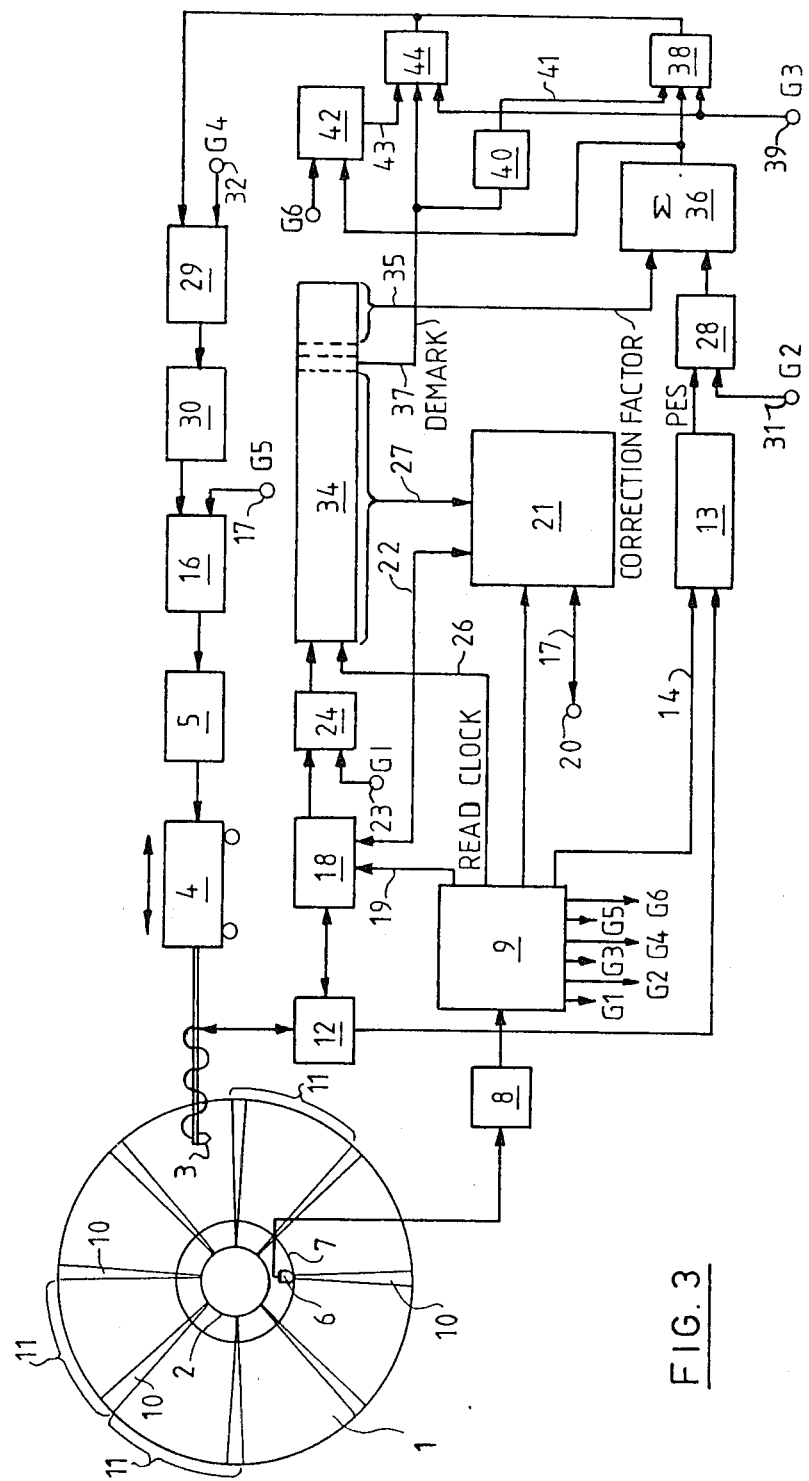
FIG. 3 shows the block diagram of a disk file recording apparatus utilizing track following servo system constructed according to the preferred embodiment of the invention.

FIG. 3 shows track following servo control circuits incorporating the present invention. The invention is described as applied to the digital control loop of the disk file shown in FIG. 2. Component parts identical to both figures are identified by the same reference numerals.

The basis of the invention lies in the provision of a one byte field in the preamble to each data record following each servo sample for that record in which a correction factor relating the next servo sample on the same track may be stored. This one byte field will hereinafter be referred to as the servo correction byte. FIG. 4 shows the format of a record track on the disk 1. Each track consists of 72 sectors each of 330 bytes in length and of identical format. One sector (Sector Sn) is shown in its entirety in FIG. 4. The track format is conventional apart from the provision of the aforementioned servo correction byte and will not be described in detail. Briefly, the format is as follows:

Bytes 0 to 6 contain a gap provided to accommodate rotational tolerances of the apparatus;

Bytes 7 to 22 contain the pre-recorded servo sample records on each side of a boundary 33 defining the on-track position for the sector;

Bytes 23 to 44 contain a pre-recorded sector ID synch field for setting AGC circuits and PLO in the data channel;

Bytes 44 and 45 contain respectively the track number address and sector number address, that is the Sector ID, of the current sector (Sector Sn);

Byte 46 contains the servo correction byte for the servo sample in the next sector (Sector Sn+1);

Bytes 47 to 66 contain pre-recorded preamble forming the data synch field; and

Bytes 67 to 330 are reserved for the data record.

The allocation of the individual bits forming the servo correction byte 46 is also shown in FIG. 4. The format employed is as follows:

bit 0 is allocated as a servo demark bit which, if set to 1, indicates that the following servo sample is unreliable to the extent that it should not be used;

bit 1 is a spare bit which is not used; and bits 2 to 7 are allocated as the position error signal correction factor in the form of a six-bit number ranging from +32 to −32.

The data to be written in the servo correction byte is determined at servo write time in the following manner.

The servo records at the beginning of each sector are written in known manner in two phases by a servo write head very accurately positioned over the disk by a specially designed servo-writer. In the first phase, the servo write head is accurately positioned over the disk and the servo information forming all the servo blocks on one side of the predetermined on-track boundary around the track are written in one pass. Rotational position of the disk drive shaft is accurately derived for example from a separate tachometer attached to the disk drive hub. The servo write head is then accurately re-positioned and the servo blocks on the other side of the on-track boundary are written around the track as the second phase. The boundary 33 produced between adjacent servo blocks is intended to define the nominal on-track position for the succeeding data record in that sector. The process described above for writing a single track is repeated across the disk surface to produce a multiplicity of concentric data tracks each defined by boundaries between adjacent servo blocks around the tracks.

As explained above, however, variation in signal energy content of the recorded servo blocks on each side of the boundary due to faults in the recording surface or servo writer error, can in practice lead to lateral displacement of this boundary from the desired position. Thus, whereas a servo head positioned accurately over the desired boundary line should detect a zero error signal for each servo sample read, in practice non-zero error signals are produced from the faulty sample. In order to compensate for these faults the error signals produced with the head accurately located over the desired boundary line are measured, stored and used, in accordance with the present invention, to dynamically correct the faulty samples as they are subsequently encountered under normal operating conditions of the file. Since the servo head width may not be equal to the track pitch, and servo records forming each sample may overlap each other, and the location of the servo boundary is not always precisely known. The technique employed to overcome this difficulty is simple but effective. The servo head is positioned as accurately as possible over the calculated boundary line, the position error signals read for each sample and averaged, the average position error signal is then subtracted from the error signal for each sample thereby arriving at the true correction values. The stored values are each subsequently converted to a 6-bit digital number and written as a correction factor in 6-bit locations of the servo correction byte in the preceding sector. Concurrently, the magnitude of the correction factor is checked against a pre-determined threshold above which the associated position error signal is considered to be uncorrectable. In this event, the demark bit is set.

The description of the apparatus incorporating the present invention will now be described in detail with reference to FIG. 3 and the waveforms shown in FIG. 5. The timing of the signal waveforms in FIG. 5 is shown in relation to the information content of a data track on the disk as read by the transducer. All the waveforms G1 to G6 are derived from conventional latches included in timing control logic 9. The read clock head 7 provides the basic timing input to logic 9 and sampled clock head 7 provides the basic timing input to logic 9 and sampled counts of this clock are used to set and reset the latches to provide the signals at appropriate times and of required duration. This technique for the production of logical timing signals is so well known that a detailed description of the timing logic 9 is not necessary.

One modification to the apparatus includes increasing the available storage capacity of the shift register 25 (FIG. 1 and FIG. 2) by one byte to provide additional storage space for the servo correction byte. The shift register in FIG. 3 with this increased capacity has been given the new reference numeral 34 to avoid confusion. The servo correction byte is loaded together with the sector ID field into the shift register during read time under control of the read clock supplied over line 26 from timing control logic 9. The load process is initiated as before by gate signal G1 applied to the gating input 23 of AND-gate 24 as described above. As seen from FIG. 5 the duration of the signal G1 is timed to coincide with the occurrence of the sector ID FIELD and correction byte as seen by the file transducer reading the disk. An appropriate number of read clock pulses is applied to clock shift register 34 so that at the end of the load operation the shift register 34 it is full of information with the servo correction byte for the next sector located at the right-hand end followed by the sector ID field for the current sector.

The six-bit correction factor of the servo correction byte is applied over bus 35 to a first set of inputs of arithmetic adder 36. The state of the demark bit is sampled by line 37. The digital signal representing the servo position error signal with which the current correction factor is associated is subsequently gated from analogue-to-digital converter 28 by gating signal G2 to a second set of inputs of adder 36. The G2 signal waveform in FIG. 5 is shown immediately following the occurrence of the servo sample for the sector being read. The adder 36 operates to add the correction factor to the associated faulty position error signal. Under normal operating conditions, that is, with the demark bit unset, the corrected position error signal at the output of adder 36 is supplied to the digital controller 29 and processed in the usual manner. This is achieved by gating the output from adder 36 through AND-gate 38 at a time defined by signal G3. The G3 signal, shown in FIG. 5, is generated by timing logic 9 and applied to a first gating input 39. As seen from FIG. 5 the G3 signal waveform is shown shortly after the termination of the G2 signal waveform when the output from adder 36 is available. The G3 waveform continues to sample the output of the adder until the G4 and G6 waveforms, to be described hereinafter, have terminated. The reason for this will become apparent later. The inverted demark bit on line 41 from inverter 40 is applied to a second gating input of AND-gate 38. Provided the demark bit is not set, gate 38 is enabled and the corrected position error signal is applied direct to the input of digital controller 29. This operates as described above at the time defined by the G4 signal waveform shown in FIG. 5 to perform the appropriate compensation function. The compensated digital position error signal from controller 29 is converted to an analogue signal by converter 30 which is sampled by sample and hold circuit 16 at a time defined by the G5 signal waveform, shown in FIG. 5, as hereinbefore described. The sampled and held corrected and compensated analogue position error signal is supplied to power amplifier 5 to drive the actuator 4 and close the servo loop. Finally, following the closing of the loop, the digital value of the current corrected position error signal still at the output of adder 36 is loaded into six-bit register 42 under control of gating signal G6 generated by timing logic 9 and supplied to terminal 43 of register 42. At the conclusion of this operation the G3 signal sampling the output of adder 36 is terminated.

It is seen therefore that the corrected position error signal for the previous sample is held in register 42 whilst the acceptable position error signal for the current sample is being processed. In the event of the demark bit being set, indicating that the current position error signal is grossly inaccurate and consequently should not be used, this stored position error signal from the previous sample is carried forward and used instead. Thus, a signal on the demark line 37, after inversion by AND-gate 40, inhibits AND-gate 38 preventing the current position error signal frofm being supplied to digital controller 29. Instead, the contents of register 42 which are continually sampled by bus 43 are gated through AND-gate 44 by the concurrent application of the demark signal on line 37 and the G3 timing signal on its gating inputs. Thus, the corrected position error signal for the previous sample is supplied to the digital controller and used to close the loop for that sample. In disk files, this compromise solution is only good to compensate for one grossly defective sample since the off-track displacement otherwise becomes too great. Disks with adjacent samples grossly defective are therefore rejected at servo write time. There is no reason, however, why a good sample should not be carried forward several times instead of a number of bad samples in systems using linear data tracks.

The servo position error signal correction operations described above are all performed using conventional hardware circuits under the influence of logical control signals. It will be apparent to those skilled in the art that all digital operations such as storage, addition and compensation can equally well be performed in a microprocessor under software control.

The invention described above is in the context of a track following servo control circuit employing digital techniques. It will be apparent to those skilled in the art that the invention may also be applied to other track following apparatus in which repeatable errors are a problem and also to apparatus in which the servo control is performed using wholly analogue techniques. Thus, in the case of an analogue track following servo loop for a disk drive, the stored six-bit digital correction factor is converted to an analogue signal and added to the analogue demodulated position error signal in an analogue adder. In the event of a demark situation arising in which the fault in the position error signal is unacceptably large, the previous position error signal is obtained from the demodulator which conveniently incorporates a sample-and-hold circuit. The demark bit is used to prevent the next servo sample from being read.

We claim:
1. A method of utilizing recorded information on a record medium,
   said information being capable of being used by servo controlled apparatus to control a transducer sampling said information to follow a path determined by the recorded information,
   said method comprising
   causinga servo read/write head to follow the desired track and to sample the recorded items of servo information,
   generating for each sampled item of servo information a position error signal indicating mis-alignment between the portion of the desired track and the actual path defined by the recorded servo information,
   recording on the medium each generated position error signal indicating mis-alignment between the portion of the desired tracks and the actual path at a location available to be read in advance of the sampling of the associated servo information item,
   determining the average value of the position error signals derived by sampling the servo information items around the track and indicating mis-alignment between the desired track and the actual servo paths,
   subtracting the average position error signal value from each individual position error-signal, and
   storing in digital form each remaining position error signal component at a location along the track available to be read in advance of the sampling of the servo information associated therewith.

2. A method in accordance with claim 1 including the additional step of determining whether said stored position error component exceeds a certain value indicating that the subsequent servo information is unusable.

3. A method in accordance with claim 1 including the additional step of determining both the magnitude and the direction of the mis-alignment represented by said stored position error component.

* * * * *